United States Patent Office 3,432,457
Patented Mar. 11, 1969

3,432,457
RESINOUS COMPOSITION COMPRISING BENZYLIC ETHER RESIN, POLYISOCYANATE, AND TERTIARY AMINE
Janis Robins, St. Paul, Minn., assignor to Ashland Oil & Refining Company, Ashland, Ky., a corporation of Kentucky
No Drawing. Continuation-in-part of application Ser. No. 569,106, Aug. 1, 1966. This application July 12, 1967, Ser. No. 652,669
U.S. Cl. 260—30.4               16 Claims
Int. Cl. C08g 5/06, 51/04

ABSTRACT OF THE DISCLOSURE

Novel resin compositions comprising mixtures of a benzylic ether resin containing repeating units of the structure

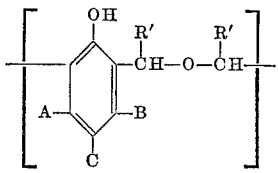

wherein A, B, and C are hydrogen, hydrocarbon radicals, oxyhydrocarbon radicals or halogen and R' is a hydrogen or hydrocarbon radical of 1 to 8 carbon atoms, with polyisocyanate and catalytic concentrations of a metal ion. The resin compositions are capable of curing at room temperature and are useful as coating and binder compositions.

---

The present invention relates to resin compositions which are mixtures of benzylic ether resins and polyisocyanates. In another aspect the present invention relates to curable binder composition which are useful in binding particulate solids such as foundry aggregates. In still another aspect, the present invention relates to combinations of a foundry aggregate, such as sand, and a binder based on benzylic ether resins and polyisocyanates which, on being formed into a coherent mass with aggregate, is capable of being cured at room temperature. This application is a continuation-in-part of application Ser. No. 569,-106, filed Aug. 1, 1966.

In the foundry art, cores for use in making metal castings are normally prepared from mixtures of an aggregate material, such as sand, which has been combined with a binding amount of a polymerizable or curable binder. Frequently, minor amounts of other materials are also included in these mixtures, e.g. iron oxide, ground flax fibers, and the like. The binder permits such a foundry mix to be molded or shaped into the desired form and thereafter cured to form a self-supporting structure.

Typically, sand is used as the aggregate material. After the sand and binder have been mixed, the resulting foundry sand mix is rammed, blown, or otherwise introduced into a pattern, thereby assuming the shape defined by the adjacent surfaces of the pattern. Then by use of catalysts, e.g. chlorine and carbon dioxide, and/or the use of heat, the polymerizable binder is caused to polymerize, thereby converting the formed, uncured foundry sand mix into a hard, solid, cured state. This hardening can be accomplished in the original pattern, in a gassing chamber, or in the holding pattern. See U.S. Patents 3,145,438 and 3,121,368, which patents are illustrative of the prior art techniques.

Phenolic resins constitute one of the well-known classes of curable resin compositions used as binders in the foundry art. Both the novolac type of phenol-aldehyde resin and the "resole" or "A-stage" resins have been used in this type of application. Novolac resins are soluble, fusible resins in which the polymer chains have phenolic endgroups. They are traditionally prepared by condensing phenols with aldehydes using acid catalysts and employing a molar excess of phenol over aldehyde. Novolac resins can be cured to insoluble, infusible products by the addition of a source of formaldehyde such as hexamethylenetetramine or paraform. Resole and resitole resins, the latter being the more highly polymerized form of a resole resin, are generally prepared using an alkaline catalyst with excess aldehyde and result in polymers having a highly branched structure and therefore a high concentration of alkylol end-groups. Since each alkylol group constitutes a potential cross-linking site, the resole and resitole resins are readily converted to the cross-linked, infusible polymer by heating. The most commonly used monomers are phenol, i.e., hydroxybenzene and formaldehyde for both the resole type and the novolac type of resin. Although both the novolac resins and the resole resins have advantages and disadvantages characteristic of their different polymer structure in their application as foundry binders, both are subject to the deficiency of requiring heat in order to achieve the cured foundry form. Frequently, it is necessary to keep the green cores in the original molds or patterns during this heating period since many heat-curable binders do not impart sufficient green strength to cause green cores to retain their desired shapes without external support until such time as a final cure can be effected.

The deficiencies of either novolac or resole resins to cure at room temperature are similarly exhibited in other areas in which novolac or resole resins find utility. Such areas include in particular molding compositions in which the phenolic resin is admixed with inert organic and inorganic fillers and coating compositions.

It is therefore an object of the present invention to provide novel resin compositions.

It is another object to provide novel resin compositions based on a type of phenolic resin having a benzylic ether structure.

It is a further object to provide binder compositions based on a type of phenolic resin having a benzylic ether structure in admixture with polyisocyanates.

It is yet another object to provide binder compositions particularly suitable for the binding of particulate solids.

Still a further object of the present invention is to provide novel foundry products based on the novel resin compositions of the present invention.

It is still another object of the present invention to provide a process for producing cores and other foundry shapes from foundry mixes incorporating the novel resin compositions of the present invention.

Other objects will become apparent from the following description and claims.

Broadly described, the binder compositions of the present invention comprise phenolic resins characterized by a benzylic ether structure dissolved in nonaqueous systems which have been combined with sufficient polyisocyanate to cross-link the phenolic resin and which contain as the curing catalyst a metal ion.

Although it has been known heretofore that isocyanates react with phenolic resins to result in cross-linked materials, heating has generally been found to be necessary to result in cross-linked materials having acceptable properties. This has been particularly true where such mixtures of phenolic resins and polyisocyanates are employed in combination with a particulate solid such as a foundry aggregate. In the absence of heating the shaped aggregates have low tensile strength and are also deficient in other mechanical properties. These deficiencies are overcome by the compositions of the present invention which combine the use of a particular type of phenolic resin and a metal ion catalyst.

One aspect of the present invention is based on the fact that metal ions dissolved in the benzylic ether resin phase catalyze its reaction with a polyisocyanate at room temperature if such metal ions exist in a non-aqueous environment. It appears that the metal, in order to function as the catalyst, must not only exist in the ionic state in the same phase as the benzylic ether resin, but furthermore that the metal ion, in order to function as the catalyst, must exist in an uncomplexed state. Since water is a strong complexing agent, and frequently found in phenolic resin compositions as a result of the methods by which the phenolic resins are produced, the substantial absence of water is emphasized as one criterion of distinguishing suitable phenolic resins from those suitable in the formation of the binders of the present invention. Water constitutes a catalyst poison which, when present in small concentrations, will reduce the catalytic activity of the metal ion but which, if present in larger concentrations, can destroy the activity of the metal ion in accelerating the cross-linking reaction. The term "nonaqueous" or "in the substantial absence of water" is therefore meant to define resin systems, i.e. components or mixtures, which contain less than 5% and preferably less than 1% by weight of such component or mixture of water. Increasing metal ion concentrations will proportionately increase the rate of cross-linking of the isocyanate with the phenolic resin. Thus, by adjusting the metal ion concentration, the phenolic resin can be cured within a few minutes to within about a day at normal or slightly elevated temperatures.

In addition to the catalytic activity of the metal ion in accelerating curing at room temperature, the structure of the phenolic resin, herein defined also as a benzylic ether resin, employed in combination with the polyisocyanate greatly enhances the ability of the resin composition to cure at room temperature and more particularly to cure at room temperature in a manner which will result in superior mechanical properties in the cured product.

The resin compositions of the present invention are generally made available as a two-package system comprising the resin component in one package and the hardener component in the other package, said resin component comprising an organic solvent solution of a nonaqueous benzylic ether resin which also contains a metal ion in catalytic concentration, the said hardener component comprising a liquid polyisocyanate having at least two isocyanate groups per molecule. At the time of use, the contents of the two packages are combined and used in the intended application. In foundry applications it is furthermore feasible to first admix one component with the foundry aggregate such as sand and thereafter add the second component and admix it with the resulting mixture. After a uniform distribution of the binder on such as the sand particles in the foundry application has been obtained, the resulting foundry mix is molded into the desired shape. The shaped product can be immediately removed from the mold and on standing at room temperature will form a cured product. The time required for curing will vary inversely with the metal ion concentration. Although the resin compositions of the present invention are particularly designed to achieve curing at room temperature it is to be understood that these resin compositions can also be cured by baking at elevated temperatures.

The benzylic ether resins of the present invention are characterized by containing repeating units having the formula:

(I) 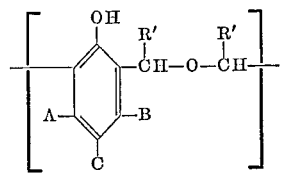

wherein A, B, and C are hydrogen, hydrocarbon radicals, oxyhydrocarbon radicals or halogen, R' is a hydrogen or a hydrocarbon radical of 1 to 8 carbon atoms and which have average degrees of polymerization, as measured by the number of repeating aromatic rings, of at least 3 and generally not above 100. Although higher molecular weight resins are operable in the curing reactions above described such resins are difficult to handle from the standpoint of viscosity in requiring excessive amounts of solvents to bring the viscosity of the resin component to a level normally desired in coating and binder applications.

The described benzylic ether resins are condensation polymers of a phenol having the general formula:

(II) 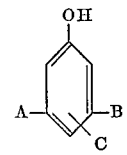

wherein A, B, and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms, prepared in the liquid phase in the substantial absence of water at temperatures below about 130° C. in the presence of catalytic concentrations of a metal ion dissolved in the reaction medium. The molar ratio of aldehyde to phenol can generally be varied from 3:1 to 1:3, although some resin is also formed outside these ratios. The preparation and characterization of these resins is disclosed in greater detail in copending application Ser. No. 536,180, filed Mar. 14, 1966. In the preferred form, these resins have the general formula:

(III) 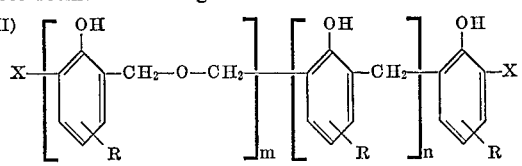

wherein R is a hydrogen or a phenolic substituent meta to the phenolic hydroxyl group, the sum of $m$ and $n$ is at least 2 and the ratio of $m$-to-$n$ is at least 1, and X is an end-group from the group consisting of hydrogen and methylol, the molar ratio of said methylol-to-hydrogen end-groups being at least 1.

The most preferred benzylic ether resins employed in the resin compositions of the present invention are those in which R is hydrogen.

The phenols employed in the formation of the benzylic ether resins are generally all phenols which have heretofore been employed in the formation of phenolic resins generally, and which are not substituted at either of the carbon atoms ortho to the hydroxyl group. Any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the phenolic resins include: alkyl substituted phenols, aryl-substituted phenols, cycloalkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 6 carbon atoms. Specific examples of suitable phenols, aside from the preferred unsubstituted phenol, include: m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The benzylic ether resin component is generally employed as a solution in an organic solvent although it is also feasible to employ the low molecular weight liquid resnis without dilution. The desirability and effect of solvents will subsequently be described in greater detail. The optimum solvent concentrations for the benzylic ether resins will vary depending on the type of resins employed and its molecular weight. In general, the solvent concentration will be in the range of up to 80% by weight of the resin solution and preferably in the range of 20 to 80%. It is preferred to keep the viscosity of the resin component at less than X–1 on the Gardner-Holt Scale.

The metal ion catalyst is generally added to the first component in the form of a metal salt. By the term "salt" is meant a compound in which the metal is ionically bonded to the salt radical. It is believed that the catalytic action of the metal salt resides in the metal ion. The principal function of the salt radical is to dissolve the metal ion in the organic medium in which the benzylic ether resin is dissolved. Hence, the salt radical is selected such that the metal salt is soluble, which is defined for purposes of the present invention as being soluble in catalytic concentrations in the phenolic resin component at room temperature. In order to preserve the ionic nature of the salt, it is preferable that the anion of the salt is derived from an acid having a dissociation constant of greater than $1 \times 10^{-8}$. Preferred radicals are carboxylates of hydrocarbon acids. Other salt radicals include perchlorates and sulfonates.

The metal ion employed as the catalyst can be a monovalent, divalent, or trivalent metal ion, or even one having a higher valence state. The preferred metal ions include lead, calcium, zinc, tin, manganese, copper, and magnesium. The efficiency of the metal catalyst will vary somewhat with each metal ion, some being more effective in catalyzing the reaction of the phenolic hydroxyl group with the polyisocyanate, while others are more effective in catalyzing the reaction of the methylol group with the polyisocyanate, and a third group being capable of catalyzing both reactions equally well. Examples of suitable catalysts are lead neodecanoate, zinc neodecanoate, lead naphthenate, manganese naphthenate, zinc naphthenate, calcium naphthenate, stannous octoate, zinc lactate, and dibutyl tin dilaurate. The particular activity of a metal ion can be established by reacting an isocyanate with saligenin and determining the extent of the reaction at either the methylol group or at the phenolic hydroxyl group by infrared spectroscopy.

In view of the varying catalytic activity and varying catalytic effect desired, catalyst concentrations will vary widely. In general, the catalyst concentration is selected such that the curing time of the binder composition is from 2 to 24 hours. This is readily established for each particular metal salt and phenolic resin and, generally, falls in the range of 0.0001 to 10 percent by weight of the phenolic resin. It is to be recognized, however, that faster curing rates can be achieved by increasing the concentration of the metal ion to the point that substantially immediate cross-linking and curing occurs when the two components are admixed with each other. However, for the purpose of a foundry binder, this is not desirable because of the resulting short bench life, i.e. the time in which the aggregate is formable and moldable. The benzylic ether resins employed in the resin compositions of the present invention contain the metal ion in the dissolved state in concentrations falling within the operative range disclosed, since such metal ions, employed in the preparation of the benzylic ether resins, are retained by the resin in dissolved form. It may, however, be desirable to either add to or extract from the benzylic ether resin component certain types or amounts of metal ion in order to achieve a desired curing rate.

The second component or package of the novel binder composition comprises an aliphatic, cycloaliphatic, or aromatic polyisocyanate having preferably from 2 to 5 isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the benzylic ether resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the benzylic ether resin. In general, the polyisocyanate will be employed in a range of 10 to 500 weight percent of polyisocyanate based on the weight of the benzylic ether resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

Although the solvent employed in combination with either the benzylic ether resin or the polyisocyanate or for both components does not enter to any significant degree into the reaction between the isocyanate and the phenolic resin, it can affect the reaction. Thus the difference in the polarity between the polyisocyanate and the benzylic ether resins restricts the choice of solvents in which both components are compatible. Such compatibility is necessary to achieve complete reaction and curing of the resin compositions of the present invention. Additionally, the solvent, by reducing the viscosity of the binder, aids in the uniform distribution of the resin composition on the substrate or the particulate solid. Polar solvents of either the protic or aprotic type are good solvents for the phenolic resin, but have limited compatibility with the polyisocyanates. Aromatic solvents, although compatible with the polyisocyanates, are less compatible with the phenolic resins. It is therefore preferred to employ combinations of solvents and particularly combinations of aromatic and polar solvents. Suitable aromatic solvents are benzene, toluene, xylene, ethylbenzene, naphthalene, and mixtures thereof. Preferred aromatic solvents are mixed solvents that have an aromatic content of at least 90% and a boiling point range of 280° to 450° F. The polar solvents should not be extremely polar such as to become incompatible with the aromatic solvent. Suitable slightly polar solvents which are compatible with aromatic solvents include, in particular, ester and ether solvents. Suitable more polar but less costly solvents are generally those which have been classified in the art as coupling solvents and include furfural, furfuryl alcohol, cellusolve acetate, butyl cellusolve, butyl carbitol, diacetone alcohol, and "Texanol."

On combining the two components of the resin composition of the present invention, the resulting mixture is capable of cross-linking at room temperature to form a coating or a binder for particulate solids. In the foundry art, the binder or its components are admixed with sand or a similar foundry aggregate to form the foundry mix. Methods of distributing the binder or its components on the aggregate particles are well-known to those skilled in the art. The foundry mix can, optionally, contain other ingredients such as iron oxide, ground flax fibers, wood cereals, pitch, refractory flours, and the like.

A valuable additive to the binder compositions of the present invention is a silane having the general formula:

wherein R' is a hydrocarbon radical and preferably an alkyl radical of 1 to 6 carbon atoms and R is an alkyl radical, an alkoxy-substituted alkyl radical or an alkyl-amino-substituted alkyl radical in which the alkyl groups have from 1 to 6 carbon atoms. The aforesaid silane, when employed in concentrations of 0.1 to 2% based on the phenolic binder and hardener, improves the adhesion of the phenolic binder to the foundry aggregate particle.

The aggregate, e.g., sand, is usually the major constituent and the binder portion constitutes a relatively minor amount, generally less than 10% and frequently within the range of 0.25 to about 5%, these figures being based on the weight of the aggregate. Although the sand employed is preferably dry sand, moisture of up to about 1 weight percent based on the weight of the sand can be tolerated. This is particularly true if the solvent employed is not water-miscible or if an excess of the polyisocyanate necessary for curing is employed, since such polyisocyanate will react with the water, thereby reducing the poisoning effect of the water on the metal ion. The resulting foundry mix is then molded into the desired core or shape, whereupon it can be cured either slowly or rapidly on standing at room temperature.

The present invention is further illustrated by the following examples in which, unless otherwise indicated, all parts are by weight and all percentages are weight percentages.

Examples 1 to 10

Foundry sand mixes were prepared by admixing 20 parts of the phenolic resins further identified below, 20 parts of butyl acetate and the below indicated amount of a mixture of di- and triphenylmethane, di- and triisocyanate commercially available as "Mondur MR" until uniform and thereafter admixing the resulting binder with 2,000 parts of silica sand until the binder was evenly distributed on the sand particles.

The resulting foundry sand mixes were then formed into standard AFS tensile test samples using the standard procedure. The resulting test samples were then cured by storage for 20 hours at 125° F.

The cured samples were then stored in either a dry atmosphere or in an atmosphere of 100% relative humidity for a period of two hours before the tensile strength was measured.

The following phenolic resins were employed:

Resin A

This resin was obtained by charging to a reflux system 720 g. paraformaldehyde, 1014 g. of phenol, 15 g. of zinc naphthenate solution (8%) and 120 ml. of benzene. The system was heated to reflux (103° C. to 126° C.). After 3 hours, during which water and benzene were distilled off, 150 ml. of diethylene glycol dimethyl ether and 10 ml. of benzene were added. An additional 150 ml. of the ether were added after one further hour of refluxing. After 5 hours, 600 ml. of tetrahydrofuran were added to dilute the resin system. A total of 310 g. of water was distilled over. The resin and the solvent weighed 2,520 g. and was found to be a benzylic ether resin corresponding to Formula III.

Resin B

The procedure employed for Resin A was repeated except that 15 g. of lead naphthenate solution (24%) instead of the zinc naphthenate solution was employed. The reflux was continued for 6 hours at a temperature of 105° C. to 125° C. without the addition of the ether. A total of 298 ml. of water was distilled over. To the resin was added 100 ml. of benzene during the reflux and 575 ml. of isopropanol at the end of the reflux. This resin was found to be a benzylic ether resin corresponding to Formula III but having a lower molecular weight than Resin A.

Resin C

This resin was obtained by charging 292 g. of phenol, 63 g. of paraform, 2 g. of zinc naphthenate and 100 g. of toluene. The reaction mixture was refluxed at 258° F. to 266° F. for a period of 6.5 hours and then heated to 380° F. The resulting resin was benzylic ether resin of the novolac type.

The results are illustrated in the following Table I.

TABLE I

| Example | Resin | Isocyanate content in parts | Exposure | Tensile Strength in p.s.i. |
|---|---|---|---|---|
| 1 | A | 20 | Dry | 175 |
| 2 | A | 20 | 100% R.H. | 115 |
| 3 | A | 10 | Dry | 235 |
| 4 | A | 10 | 100% R.H. | 90 |
| 5 | B | 20 | Dry | 185 |
| 6 | B | 20 | 100% R.H. | 170 |
| 7 | B | 10 | Dry | 175 |
| 8 | B | 10 | 100% R.H. | 150 |
| 9 | C | 20 | Dry | 170 |
| 10 | C | 20 | 100% R.H. | 125 |

Examples 11 to 15

The procedures of Examples 1 to 10 were repeated except that 1% of a silane having the formula:

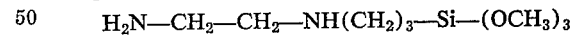

was added to the binder. The following results were obtained:

TABLE II

| Example | Resin | Isocyanate content in parts | Exposure | Tensile Strength in p.s.i. |
|---|---|---|---|---|
| 11 | B | 20 | Dry | 260 |
| 12 | B | 20 | 100% R.H. | 380 |
| 13 | B | 10 | Dry | 440 |
| 14 | B | 10 | 100% R.H. | 340 |
| 15 | B | 5 | Dry | 450 |

Examples 16 to 24

Into a sealed kettle was charged 62.5 lbs. of phenol, 46.5 lbs. of paraformaldehyde, 0.95 lb. of a 24% solution of lead naphthenate in toluene and 4 lbs. of toluene. The vessel was sealed and heated to temperatures of 100° C. to 125° C. for a period of 3 hours. During this heating period, the pressure was maintained at 2 to 4 p.s.i., and steam released from the vessel as pressure increased. Some toluene distilled out with the steam. A total of 24 lbs. of water was removed. After 3 hours, a vacuum was pulled on the reaction mixture to remove all the toluene originally added, and 36.5 lbs. of cellusolve acetate was added to the 116 lbs. of resin obtained.

The resin was of the benzylic ether type as defined in Formula III.

To parts of the resin solution were then added the catalysts in the amounts stated in Table III. The resulting resin solution was then admixed with 5,000 parts of Wedron silica sand until uniformly distributed and the amounts of solvent and polyisocyanate indicated in the table were added and distributed on the sand. The solvent employed was an aromatic solvent commercially available as "Solvesso-100," and the polyisocyanate was "Mondur MR."

The bench life of the foundry mix, i.e. the time between the forming of the mix and the degree of reaction which prevented the shaping of a coherent structure, was established.

The foundry mixes prepared were formed into standard AFS tensile test samples using the standard procedure. The tensile strengths of such samples were determined after standing at room temperature for 2, 4, and 24 hours, and after 16 hours at 125° F. (A.C.). The results obtained are listed in Table III.

6. The binder composition of claim 1, wherein the benzylic ether resin is obtained by polymerizing a phenol and an aldehyde in the liquid phase in the substantial absence of water at temperatures below 130° C. in the presence of catalytic concentrations of a metal ion.

7. The binder composition of claim 1, wherein the benzylic ether resin has the general formula:

$$X\left[\begin{array}{c}OH\\ \phantom{x}\\ \phantom{x}\\ R\end{array}-CH_2-O-CH_2\right]_m\left[\begin{array}{c}OH\\ \phantom{x}\\ \phantom{x}\\ R\end{array}-CH_2\right]_n\begin{array}{c}OH\\ \phantom{x}\\ \phantom{x}\\ R\end{array}X$$

wherein R is hydrogen or a phenolic substituent meta to the hydroxyl group of the phenol, $m$ and $n$ are numbers the sum of which is at least 2, and the ratio of $m$-to-$n$ is at least 1 and X is a hydrogen or a methylol group, the molar ratio of said methylol group-to-hydrogen being at least 1.

TABLE III

| Example | Catalyst | Catalyst (in parts) | Resin Solution (in parts) | Poly-isocyanate (in parts) | Solvent (in parts) | Bench Life (in minutes) | Tensile Strength (in p.s.i.) | | | |
|---|---|---|---|---|---|---|---|---|---|---|
| | | | | | | | 2 hrs. | 4 hrs. | 24 hrs. | A.C. |
| 16 | Phenyl mercury acetate | 1.0 | 25 | 26 | 15 | 15 | 220 | 280 | 280 | 340 |
| 17 | Zinc naphthenate | 0.5 | 25 | 26 | 15 | 52 | 20 | | 150 | 200 |
| 18 | Lead naphthenate | 0.4 | 25 | 26 | 15 | 21 | 90 | 180 | 280 | 290 |
| 19 | do | 0.3 | 25 | 26 | 15 | 42 | 40 | 110 | 270 | 240 |
| 20 | Calcium naphthenate | 1.0 | 25 | 26 | 15 | 15 | 80 | 190 | 220 | 260 |
| 21 | Copper naphthenate | 0.5 | 25 | 26 | 15 | 18 | 70 | 170 | 280 | 260 |
| 22 | Stannous octoate | 0.4 | 25 | 26 | 15 | 25 | 70 | 150 | 160 | 270 |
| 23 | Manganese naphthenate | 1.3 | 25 | 26 | 15 | 34 | 70 | 190 | 190 | 300 |
| 24 | Dibutyl tin dilaurate | 0.4 | 25 | 26 | 15 | 25 | 100 | 220 | 200 | 220 |

The foregoing examples have illustrated the formation of the resin compositions of the present invention and their applications as binders. Other polyisocyanates coming within the scope of the disclosure can be employed in place of the polyisocyanates specifically illustrated in the examples, and will give rise to similar results. The resin compositons formulated in the foregoing examples can furthermore be used as coating vehicles and will form cross-linked coatings of superior properties on exposure at room temperature. It is, therefore, not intended to limit the scope of the present invention to the specific embodiments illustrated, since many variations and modifications will be apparent to those skilled in the art.

What is claimed is:

1. A resin composition comprising in admixture a resin component, a hardener component, and a curing agent, said resin component comprising an organic solvent solution of a benzylic ether resin; said hardener component comprising liquid polyisocyanate containing at least two isocyanate groups; and said curing agent comprising a metal ion.

2. The binder composition of claim 1, wherein the benzylic ether resin has repeating units of the formula:

$$\left[\begin{array}{c}OH\\ \phantom{x}\\ A-\phantom{x}-B\\ C\end{array}\begin{array}{c}R'\\ |\\ -CH-O-CH-\\ |\\ R'\end{array}\right]$$

wherein A, B, and C are hydrogen, hydrocarbon radicals, oxyhydrocarbon radicals, or halogen, and wherein R' is a hydrogen or a hydrocarbon radical of 1 to 8 carbon atoms.

3. The binder composition of claim 2, wherein the aldehyde is formaldehyde.

4. The binder composition of claim 2, wherein the aldehyde is formaldehyde, and A and B are hydrogen, and C is a hydrocarbon radical.

5. The binder composition of claim 2, wherein the aldehyde is formaldehyde and A, B, and C are hydrogen.

8. The binder composition of claim 7, wherein R is hydrogen.

9. The binder composition of claim 1, wherein the polyisocyanate is an aromatic polyisocyanate.

10. The binder composition of claim 9, wherein the aromatic polyisocyanate is diphenylmethane diisocyanate.

11. The binder composition of claim 7, wherein the polyisocyanate is an aromatic polyisocyanate.

12. The binder composition of claim 1, wherein the metal ion is a divalent metal ion.

13. The binder composition of claim 1, wherein the metal ion is in the form of a metal salt, the acid of said salt radical being a carboxylic acid having a dissociation constant above $1 \times 10^{-8}$.

14. A foundry mix containing sand as the major constituent and a binding amount of up to 10% based on the weight of sand of the binder of claim 1.

15. A foundry mix containing sand as the major constituent and a binding amount of up to 10% based on the weight of sand of the binder of claim 7.

16. A binder composition capable of room temperature curing, comprising:

(a) a benzylic ether resin having repeating units of the formula $$\left[\begin{array}{c}OH\\ \phantom{x}\\ \phantom{x}\end{array}-CH_2-O-CH_2-\right]$$

(b) a polyisocyanate having at least two isocyanate groups, said polyisocyanate being present in a concentration of 20 to 300% by weight of the benzylic ether resin;

(c) an inert organic solvent in a concentration of up to 80% by weight of both the benzylic ether resin and polyisocyanate; and (d) catalytic concentrations of a metal salt, the acid of said salt radical being a carboxylic acid having a dissociation constant above $1 \times 10^{-8}$.

(References on following page)

References Cited

UNITED STATES PATENTS 2,374,136   4/1945   Rothrock _____ 260—59
2,869,195   1/1959   Cooper.
2,349,756   7/1940   Pratt.

MORRIS LIEBMAN, *Primary Examiner.*
R. BARON, *Assistant Examiner.*

U.S. Cl. X.R.

260—52, 50, 38

UNITED STATES PATENT OFFICE
CERTIFICATE OF CORRECTION

Patent No. 3,432,457                                        March 11, 1969

Janis Robins

It is certified that error appears in the above identified patent and that said Letters Patent are hereby corrected as shown below:

Column 5, line 21, "resnis" should read -- resins --. Column 8, TABLE II, fifth column, line 1 thereof, "260" should read -- 360 --. Column 9, line 40, "compositons" should read -- compositions --.

Signed and sealed this 14th day of April 1970.

(SEAL)
Attest:

Edward M. Fletcher, Jr.                             WILLIAM E. SCHUYLER, JR.
Attesting Officer                                           Commissioner of Patents